(12) United States Patent
Kajiwara

(10) Patent No.: US 7,769,872 B2
(45) Date of Patent: Aug. 3, 2010

(54) GATEWAY APPARATUS, NETWORK TERMINAL APPARATUS AND COMMUNICATION METHOD

(75) Inventor: Tomohito Kajiwara, Tokyo (JP)

(73) Assignee: Ricoh Company, Ltd., Tokyo (JP)

( * ) Notice: Subject to any disclaimer, the term of this patent is extended or adjusted under 35 U.S.C. 154(b) by 1719 days.

(21) Appl. No.: 10/942,181

(22) Filed: Sep. 16, 2004

(65) Prior Publication Data

US 2005/0110616 A1    May 26, 2005

(30) Foreign Application Priority Data

Sep. 19, 2003    (JP)    ............................. 2003-328042

(51) Int. Cl.
    *G06F 13/00*    (2006.01)
(52) U.S. Cl. ...................... 709/228; 709/217; 709/250
(58) Field of Classification Search .............. 709/217, 709/218, 227, 228, 249, 250
    See application file for complete search history.

(56) References Cited

U.S. PATENT DOCUMENTS

| | | | | |
|---|---|---|---|---|
| 5,587,810 | A * | 12/1996 | Feldman | ...................... 358/442 |
| 6,956,860 | B1 * | 10/2005 | Colban | ........................ 370/401 |
| 7,002,972 | B1 * | 2/2006 | Endo | ............................ 370/401 |
| 7,099,438 | B2 * | 8/2006 | Rancu et al. | ..................... 379/9 |
| 7,355,735 | B1 * | 4/2008 | Sivan et al. | ................. 358/1.15 |
| 7,400,714 | B2 * | 7/2008 | Tanimoto | ................ 379/100.12 |
| 7,406,072 | B1 * | 7/2008 | Somekh et al. | .............. 370/352 |
| 2002/0120700 | A1 | 8/2002 | Tamura | |
| 2002/0178389 | A1 | 11/2002 | Satoh | |
| 2002/0186427 | A1 | 12/2002 | Orikasa | |
| 2003/0016395 | A1 | 1/2003 | Kajiwara | |
| 2003/0030847 | A1 | 2/2003 | Amemiya et al. | |
| 2004/0001221 | A1 * | 1/2004 | McCallum | .................. 358/1.15 |
| 2004/0001224 | A1 | 1/2004 | Kajiwara | |

FOREIGN PATENT DOCUMENTS

| | | |
|---|---|---|
| EP | 0658038 A2 | 6/1995 |
| EP | 0691782 A2 | 1/1996 |
| EP | 0939541 A2 | 9/1999 |
| JP | 8-107436 | 4/1996 |
| JP | 2001-203869 | 7/2001 |
| JP | 2001-292267 | 10/2001 |

OTHER PUBLICATIONS

"Procedures for real-time Group 3 facsimile communication over IP-networks", ITU-T Recommendation T.38, 1998, pp. 1-30.
Jun. 17, 2008 Japanese official action in connection with corresponding Japanese patent application No. 2003-328042.

* cited by examiner

*Primary Examiner*—Viet Vu
(74) *Attorney, Agent, or Firm*—Cooper & Dunham LLP

(57) ABSTRACT

A gateway apparatus including a gateway function conforming to the ITU-T recommendation T.38 is provided. The gateway apparatus can be connected to both of an analog public network and an IP network, and the gateway apparatus includes a signal blocking part that does not pass a received T.30 facsimile non-standard signal through the gateway apparatus.

7 Claims, 11 Drawing Sheets

GATEWAY APPARATUS, NETWORK TERMINAL APPARATUS AND COMMUNICATION METHOD

BACKGROUND

1. Technical Field

This disclosure relates to a gateway apparatus including gateway functions that conform to the ITU-T recommendation T.38, and relates to a network terminal apparatus including terminal functions that conform to the ITU-T recommendation T.38, wherein the gateway apparatus is connected to both of an analog public network and an IP network, and the network terminal apparatus is connected to an IP network.

2. Description of the Related Art

Recently, a communication apparatus that conforms to the ITU-T recommendation T.38 has been brought into practical use for realizing facsimile communications by using the IP network such as the Internet as a relay network. Japanese laid-open patent application No. 2001-292267 discloses this technology.

For example, the gateway apparatus that includes communication functions conforming to the recommendation T.38 is connected to both of the analog public network and the IP network, and the gateway apparatus provides gateway functions to each of a group 3 facsimile apparatus in a sending side and a group 3 facsimile apparatus in a receiving side.

In a communication system using such a gateway apparatus, for example, the group 3 facsimile apparatus in the sending side originates a call to a first gateway apparatus via an analog public network, and sends a facsimile number of a destination group 3 facsimile apparatus to the first gateway apparatus. Then, the first gateway apparatus connects to a second gateway corresponding to the destination facsimile number via the IP network so as to send the destination facsimile number to the second gateway. Then, the second gateway originates a call to the destination group 3 facsimile apparatus corresponding to the specified facsimile number.

Accordingly, a communication path is established between the group 3 facsimile apparatus in the sending side and the group 3 facsimile apparatus in the receiving side via the analog public network, the first gateway apparatus, the IP network, the second gateway apparatus and the analog public network. By using the communication path, predetermined facsimile communication operations are performed between the group 3 facsimile apparatus in the sending side and the group 3 facsimile apparatus in the receiving side.

In such a communication system, if the distance between the group 3 facsimile apparatus in the sending side and the group 3 facsimile apparatus in the receiving side are long, there is a merit that communication cost can be reduced since the IP network is used as a relay network.

In addition, in a situation in which VoIP (Voice over IP) communications become widespread in recent years, the communication cost can be further reduced since the IP network being used for the VoIP can be used for facsimile communications as it is.

In the above-mentioned communication system, if makers of the group 3 facsimile apparatus in the sending and the group 3 facsimile apparatus in receiving sides are the same, the communication system can be controlled such that facsimile communications can be performed more efficiently by using maker-specific features. In this case, so-called maker-specific mode (also to be referred to as "non-standard mode") can be utilized.

That is, compared to standard communication functions provided by the ITU-T recommendation T.30 that defines the group 3 facsimile communication procedure, the better performance can be obtained by using the maker-specific optional functions. For example, a communication time can be reduced and a higher quality image can be obtained by using the maker-specific optional functions.

Signals used for negotiations for the optional functions in facsimile transmission control procedure signals are signals that can set optional functions, which are, for example, NSF, NSC and NSS.

Mapping information in information fields in the signals that define the optional functions is maker-specific, and is not disclosed to other makers.

Therefore, if a maker of a gateway apparatus connected to a group 3 facsimile apparatus is different from a maker of the group 3 facsimile apparatus, the gateway apparatus can not interpret information in information fields in the signals NSF, NSC and NSS transmitted by the group 3 facsimile apparatus. Therefore, for example, the gateway apparatus cannot detect a communication speed determined between the sending side and the receiving side. As a result, a communication error occurs in a stage in which image information is sent and received (phase C in the group 3 facsimile transmission procedure), so that the communication path is disconnected.

SUMMARY

In an aspect of this disclosure, there is provided a gateway apparatus and a network terminal apparatus that can properly perform communications that conform to the ITU-T recommendation T.38.

In another aspect, there is provided a gateway apparatus including a gateway function conforming to the ITU-T recommendation T.38, wherein the gateway apparatus can be connected to both of an analog public network and an IP network, the gateway apparatus including:

a signal blocking part that does not pass a received T.30 facsimile non-standard signal through the gateway apparatus.

In the gateway apparatus, the signal blocking part does not pass the T.30 facsimile non-standard signal that is received first in a communication connection procedure through the gateway apparatus.

The gateway apparatus may further including:

a maker code registration part for registering at least one maker code; and wherein the signal blocking part passes the received T.30 facsimile non-standard signal through the gateway apparatus if a maker code included in the received T.30 facsimile non-standard signal is included in the at least one maker code registered in the maker code registration part; and the signal blocking part does not pass the received T.30 facsimile non-standard signal through the gateway apparatus if a maker code included in the received T.30 facsimile non-standard signal is not included in the at least one maker code registered in the maker code registration part.

In another aspect of this disclosure, there is provided a network terminal apparatus including a terminal function conforming to the ITU-T recommendation T.38, wherein the network terminal apparatus can be connected to an IP network, the network terminal apparatus including:

a manufacturer code registration part for registering at least one set of a manufacturer code and a product code; and a communication control part for causing the network terminal apparatus:

to perform communication operations by using a T.30 facsimile non-standard signal if a manufacturer code and a product code included in a call control signal received in a call connection procedure is included in the at least one set of a manufacturer code and a product code registered in the manufacturer code registration part, and to perform communication operations without using a T.30 facsimile non-standard signal if a manufacturer code and a product code included in a call control signal received in a call connection procedure is not included in the at least one set of a manufacturer code and a product code registered in the manufacturer code registration part.

Since a non-standard signal sent from an apparatus manufactured by a maker that is not registered beforehand can be blocked, exchange of non-standard signals is not performed in the group 3 facsimile transmission procedure so that the standard group 3 facsimile transmission procedure can be performed. As a result, facsimile communications can be performed properly.

BRIEF DESCRIPTION OF THE DRAWING

Other aspects, features and advantages will become more apparent from the following detailed description when read in conjunction with the accompanying drawings, in which.

DETAILED DESCRIPTION OF THE PREFERRED EMBODIMENTS

In the following, embodiments of the present invention are described with reference to figures.

Figure 1:
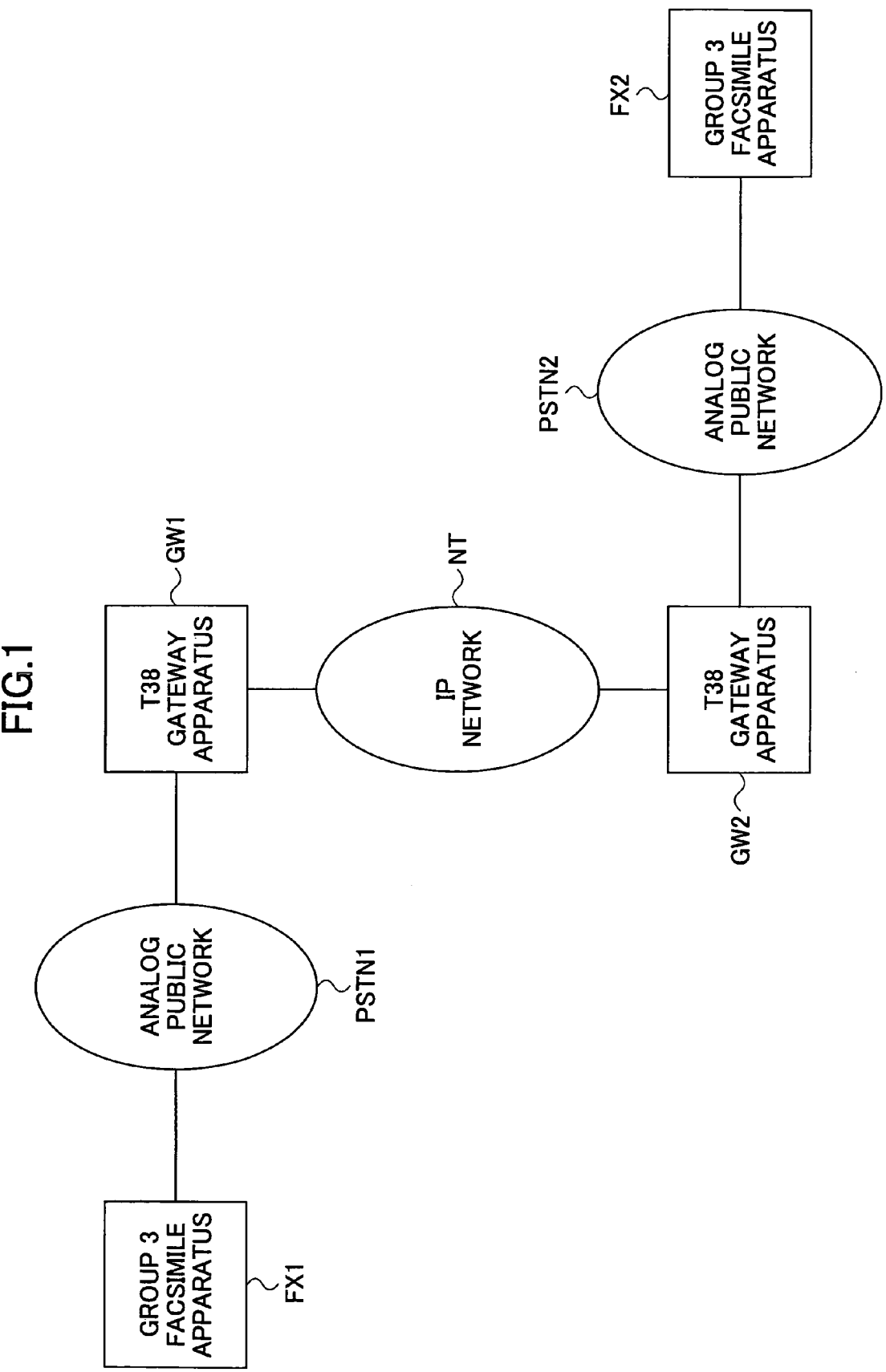
FIG. 1 shows an example of a facsimile communication system of an embodiment of the present invention.

FIG. 1 shows an example of a facsimile communication system of an embodiment of the present invention.

The facsimile communication system includes a group 3 facsimile apparatus FX1 connected to an analog public network PSTN1, a T38 gateway apparatus GW1 that is connected to the analog public network and to an IP network NT and that includes gateway functions conforming to the ITU-T recommendation T.38, a group 3 facsimile apparatus FX2 connected an analog public network PSTN2, and a T38 gateway apparatus GW2 that is connected to the analog public network PSTN2 and to the IP network NT and that includes gateway functions conforming to the ITU-T recommendation T.38.

The group 3 facsimile apparatus FX1 and the T38 gateway apparatus GW1 are placed in a same area. Also, the group 3 facsimile apparatus FX2 and the T38 gateway apparatus GW2 are placed in a same area. These areas are distant each other.

Therefore, in this case, the T38 gateway apparatus GW1 provides a real-time internet facsimile communication service that conforms to the recommendation T.38 to the group 3 facsimile apparatus FX1. In addition, the T38 gateway apparatus GW2 provides the real-time internet facsimile communication service that conforms to the recommendation T.38 to the group 3 facsimile apparatus FX2.

Figure 2:
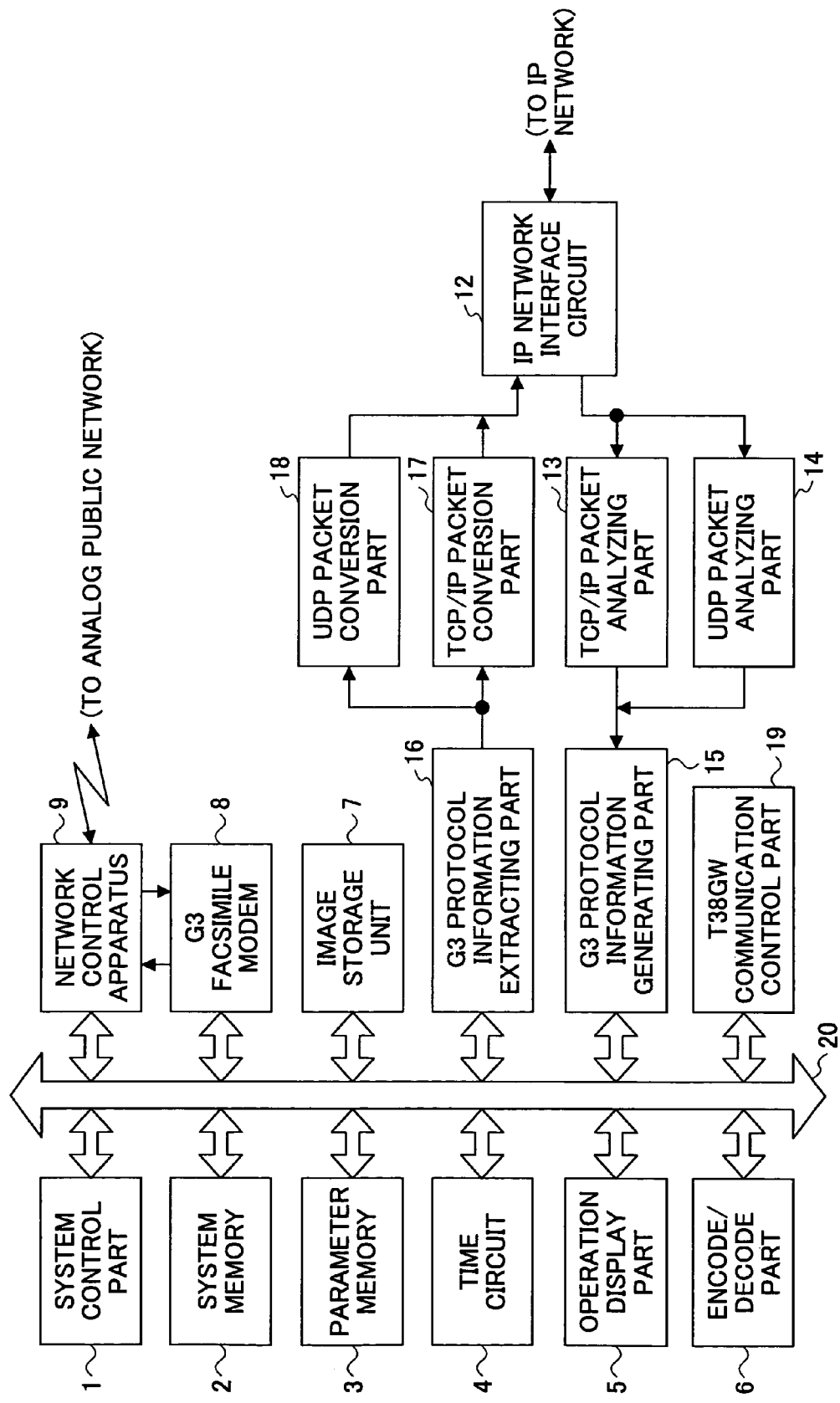
FIG. 2 is a block diagram showing a configuration example of a T38 gateway apparatus.

FIG. 2 shows a configuration example of the T38 gateway apparatus GW (GW1, GW2).

In the figure, a system control part 1 performs various control processes such as control processes for each part of the T38 gateway apparatus, facsimile transmission control procedure (ITU-T recommendation T.30 procedure) processes, and real-time transmission control procedure (ITU-T recommendation T.38 procedure) processes. A system memory 2 stores a control processing program to be executed by the system control part 1 and various data necessary for executing processing programs. The system memory 2 also forms a work area for the system control part 1. A parameter memory 3 stores various pieces of information specific to the T38 gateway apparatus GW. A time circuit 4 outputs current time information.

An operation display part 5 is used for operating the T38 gateway apparatus GW, and includes various operation keys and various indicators. The encode/decode part 6 encode-compresses image signals and decodes compressed image information into original image signals. In this embodiment, the encode/decode part 6 is used mainly for detecting an error when image information is received. An image storage unit 7 is for storing many pieces of compressed image information.

A group 3 facsimile modem 8 is used for realizing group 3 facsimile modem functions, and includes a low speed modem function (V.21 modem) for exchanging transmission procedure signals and a high speed modem function (V.17 modem, V.34 modem, V.29 modem, V.27 ter modem, etc.) for mainly exchanging image information.

A network control apparatus 9 is used for connecting the T38 gateway apparatus to the analog public network PSTN, and includes an automatic originating and receiving function.

An IP network interface circuit 12 is used for connecting the T38 gateway apparatus GW to the IP network NT so as to send and receive data via the IP network NT. A TCP/IP packet analyzing part 13 is used for, in a TCP mode, analyzing a TCP/IP packet received by the IP network interface circuit 12 to extract received information. A UDP packet analyzing part 14 is used for, in a UDP mode, analyzing a UDP packet received by the IP network interface circuit 12 to extract received information.

In a real time transmission procedure, a group 3 protocol information generation part 15 converts, in the TCP mode, received information output from the TCP/IP packet analyzing part 13 into corresponding group 3 transmission procedure signal information. In addition, in the UDP mode, the group 3 protocol information generation part 15 converts received information output from the UDP packet analyzing part 14 into corresponding group 3 transmission procedure signal information.

In a real time transmission procedure, a group 3 protocol information extracting part 16 is used for extracting group 3 facsimile transmission procedure information to be transmitted. A TCP/IP packet conversion part 17 is used for, in the TCP mode, converting the group 3 facsimile transmission procedure information output from the group 3 protocol information extracting part 16 into TCP/IP packet data. The output data is applied to the IP network interface circuit 12.

The UDP packet conversion part 18 is used for, in the UDP mode, converting the group 3 facsimile transmission procedure information output from the group 3 protocol information extracting part 36 into UDP packet data. The output data is applied to the IP network interface circuit 12.

A T38GW communication control part 19 is for performing communication processing of the gateway function conforming to the recommendation T.38 performed by the T38 gateway apparatus GW.

The system control part 1, the system memory 2, the parameter memory 3, the time circuit 4, the operation display part 5, the encode/decode part 6, the image storage unit 7, the group 3 facsimile modem 8, the network control apparatus 9, the group 3 protocol information generating part 15, the group 3 protocol information extracting part 16 and the T38GW communication control part 19 are connected to an internal bus 20, such that data exchange between these components are mainly performed via the internal bus 20.

Data are exchanged between the network control apparatus 9 and the group 3 facsimile modem 8 directly.

Figure 3:
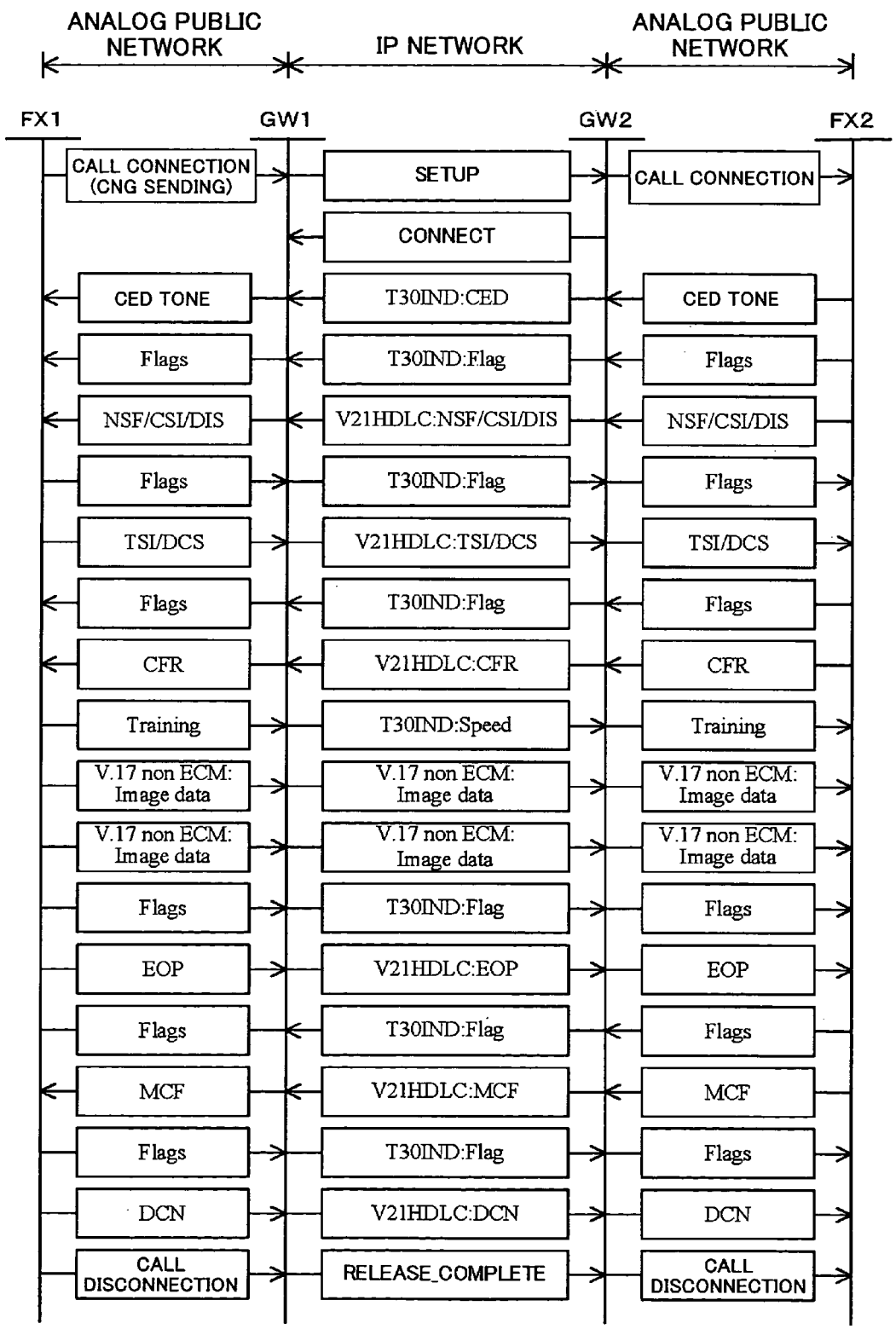
FIG. 3 is a sequence chart showing an example of the communication procedure (real-time transmission procedure) of the recommendation T.38.

FIG. 3 shows an example of the communication procedure (real-time transmission procedure) of the recommendation T.38. This example shows a case where the group 3 facsimile apparatus FX1 originates a call to the group 3 facsimile apparatus FX2 to send image information. Signals sent/received between the group 3 facsimile apparatuses FX1, FX2 and the T38 gateway apparatuses GW1, GW2 are T30 facsimile signals conforming to the recommendation T.30. Signals (packets) sent/received between the T38 gateway apparatuses GW1 and GW2 are T38 packets conforming to the recommendation T.38.

First, the group 3 facsimile apparatus FX1 originates a call to the T38 gateway apparatus GW1, and sends a destination telephone number specified by a user by using the push button signal PB. When the T38 gateway apparatus GW1 detects an incoming call, the T38 gateway apparatus GW1 responds to the call, and, then, receives the destination telephone number from the group 3 facsimile apparatus FX1 by the push button signal PB.

Next, the group 3 facsimile apparatus FX1 sends a tone signal CNG of the recommendation T.30 to the T38 gateway apparatus GW1 for requesting call connection. Accordingly, the T38 gateway apparatus GW1 sends a SETUP packet to the T38 gateway apparatus GW2 to request connection, and sends the destination telephone number. Accordingly, the T38 gateway apparatus GW2 originates a call to the specified group 3 facsimile apparatus FX2, and sends a predetermined tone signal CNG to request call connection. In addition, the T38 gateway apparatus GW2 sends a CONNECT packet to the T38 gateway apparatus GW1 to acknowledge call connection.

The group 3 facsimile apparatus FX2 that receives a call connection request from the T38 gateway apparatus GW2 responds to the incoming call, and sends a predetermined tone signal CED ("called station identifying signal") to the T38 gateway apparatus GW2. When the T38 gateway apparatus GW2 detects the tone signal CED, the T38 gateway apparatus GW2 sends a signal (T30IND:CED) that indicates the signal CED is detected to the T38 gateway apparatus GW1. Accordingly, the T38 gateway apparatus GW1 sends a tone signal CED to the group 3 facsimile apparatus FX1.

Next, the group 3 facsimile apparatus FX2 sends a flag (Flags) signal, and sends a signal NDF, a signal CSI, and a signal DIS successively, wherein the signal NSF is a group 3 facsimile transmission procedure signal and is used for notifying the receiving side apparatus of optional transmission functions of the group 3 facsimile apparatus FX2, the signal CSI is a signal used for notifying the receiving side apparatus of an identifying signal of the group 3 facsimile apparatus FX2, and the signal DIS is a signal used for notifying the receiving side apparatus of a standard transmission function of the group 3 facsimile apparatus FX2. When the T38 gateway apparatus GW2 detects the flag signal, the T38 gateway apparatus GW2 sends a signal (30IND:Flags) to the T38 gateway apparatus GW1. In addition, when the T38 gateway apparatus GW2 detects the signals NSF, CSI, and DIS successively, the T38 gateway apparatus GW2 sends signals (V21HDLC:NSF/CSI/DIS) indicating the signals NSF, CSI, DIS to the T38 gateway apparatus GW1 successively.

Accordingly, the T38 gateway apparatus GW1 starts to send the flag signal to the group 3 facsimile apparatus FX1 at the time when the T38 gateway apparatus GW1 receives the flag signal. When the T38 gateway apparatus GW1 receives the signals (V21HDLC:NSF/CSI/DIS), the T38 gateway apparatus GW1 sends the corresponding signals NSF, CSI, DIS to the group 3 facsimile apparatus FX1.

Accordingly, the group 3 facsimile apparatus FX1 knows the identifying signal and the transmission function of the group 3 facsimile apparatus FX2. On the basis of the transmission function, the group 3 facsimile apparatus FX1 sets a transmission function and a modem speed and the like. Next, the group 3 facsimile apparatus FX1 sends a signal TSI and a signal DCS in this order after sending a flag signal, in which the signal TSI is a group 3 facsimile transmission procedure signal and is used for notifying a receiving side apparatus of an identifying signal of the group 3 facsimile apparatus FX1, and the signal DCS is used for notifying a receiving side apparatus of a transmission function to be used. In addition, the group 3 facsimile apparatus FX1 sends a signal TCF for performing modem training at the notified modem speed.

When the T38 gateway apparatus GW1 detects the flag signal, the T38 gateway apparatus GW1 sends a signal (T30IND:Flags) to the T38 gateway apparatus GW2. In addition, when the T38 gateway apparatus GW1 detects the signals TSI, DCS and TCF successively, the T38 gateway apparatus GW1 sends signals (V21HDLC:TSI/DCS) that indicate the signals TSI and DCS to the T38 gateway apparatus GW2.

After that, at the time when receiving the flag signal, the T38 gateway apparatus GW2 starts to send a flag signal to the group 3 facsimile apparatus FX2. When the T38 gateway apparatus GW2 receives the signals (V21HDLC:TSI/DCS), the T38 gateway apparatus GW2 sends corresponding signals TSI and DCS and a signal TCF to the group 3 facsimile apparatus FX2.

When the group 3 facsimile apparatus FX2 receives the signal TSI, the group 3 facsimile apparatus FX2 obtains the identifying information of the party on the other end (group 3 facsimile apparatus FX1). When receiving the signal DCS, the group 3 facsimile apparatus FX2 obtains the transmission function to be used so as to set a modem speed and receive the signal TCF.

Then, when the receiving result of the signal TCF is good, the group 3 facsimile apparatus FX2 sends a signal CFR after sending a flag signal wherein the signal CFR is a group 3 facsimile transmission procedure signal and is used for notifying a receiving side apparatus of completion of preparation of receiving. When detecting the flag signal, the T38 gateway apparatus GW2 sends a signal (T30IND:Flags) to the T38 gateway apparatus GW1. When detecting the signal CFR, T38 gateway apparatus GW2 sends a signal (V21HDLC: CFR) indicating the signal CFR to the T38 gateway apparatus GW1.

At the time when the T38 gateway apparatus GW1 receives the flag signal, the T38 gateway apparatus GW1 starts to send a flag signal to the group 3 facsimile apparatus FX1. When the T38 gateway apparatus GW1 receives the signal (V21HDLC: CFR), the T38 gateway apparatus GW1 sends a corresponding signal CFR to the group 3 facsimile apparatus FX1.

When preparations for sending image information completes, the group 3 facsimile apparatus FX1 sends a training signal for retraining a modem. After that, the group 3 facsimile apparatus FX1 sends image information. After that, the group 3 facsimile apparatus FX1 sends a flag signal, and a signal EOP indicating that sending of the image information ends.

When the T38 gateway apparatus GW1 detects the training signal from the group 3 facsimile apparatus FX1, the T38 gateway apparatus GW1 sends a signal (T30IND:Speed) to the T38 gateway apparatus GW2. Next, the T38 gateway apparatus GW1 divides image information received from the group 3 facsimile apparatus FX1 into a plurality of pieces of image information, and send each piece of image information to the T38 gateway apparatus GW2 as packet data. When the T38 gateway apparatus GW1 detects the flag signal from the group 3 facsimile apparatus FX1, the T38 gateway apparatus GW1 sends a signal (T30IND:Flags) to the T38 gateway apparatus GW2. When detecting the signal EOP, the T38 gateway apparatus GW1 sends a signal (V21HDLC:EOP) indicating the signal EOP to the T38 gateway apparatus GW2.

When the T38 gateway apparatus GW2 receives the signal (T30IND:Speed), the T38 gateway apparatus GW2 sends a corresponding training signal to the group 3 facsimile apparatus FX2. When receiving the packets of the image information, the T38 gateway apparatus GW2 retrieves the divided pieces of the image information from the packets, and connects the pieces to generate the image information so that the T38 gateway apparatus GW2 sends the image information to the group 3 facsimile apparatus FX2. After sending the image information, the T38 gateway apparatus GW2 starts to send a flag signal to the group 3 facsimile apparatus FX2. At this time, since the T38 gateway apparatus GW2 receives a signal (V21HDLC:EOP), the T38 gateway apparatus GW2 sends a corresponding signal EOP to the group 3 facsimile apparatus FX2.

The group 3 facsimile apparatus FX2 performs retraining of the modem by using the training signal received from the T38 gateway apparatus GW2. After that, the group 3 facsimile apparatus FX2 receives the image information, and receives the signal EOP next to th flag signal. Then, the group 3 facsimile apparatus FX2 recognizes that receiving of the image information is completed. Then, when the receiving result of the image information is good, the group 3 facsimile apparatus FX2 sends a signal MCF indicating that the receiving result of the image information is good to T38 gateway apparatus GW2 after sending a flag signal.

When the T38 gateway apparatus GW2 detects the flag signal, the T38 gateway apparatus GW2 sends a signal (T30IND:Flags) to the T38 gateway apparatus GW1. When detecting the signal MCF, the T38 gateway apparatus GW2 sends a signal (V21HDLC:MCF) indicating the signal MCF to the T38 gateway apparatus GW1.

When the T38 gateway apparatus GW1 detects the flag signal, the T38 gateway apparatus GW1 starts to send a flag signal to the group 3 facsimile apparatus FX1. When receiving the signal (V21HDLC:MCF), the T38 gateway apparatus GW1 sends a corresponding signal MCF to the group 3 facsimile apparatus FX1.

Then, the group 3 facsimile apparatus FX1 recognizes that the image information was successfully received by the group 3 facsimile apparatus FX2. After that, after sending a flag signal, the group 3 facsimile apparatus FX1 sends a signal DCN for instructing line restoration to the T38 gateway apparatus GW1 to restore the line.

Accordingly, by the procedure same as the above-mentioned procedure, s signal (T30IND:Flags) and a signal (V21HDLC:DCN) are sent from the T38 gateway apparatus GW1 to the T38 gateway apparatus GW2. Then, the T38 gateway apparatus GW2 sends the flag signal and the signal DCS to the group 3 facsimile apparatus FX2. When the group 3 facsimile apparatus FX2 receives the signal DCN, the group 3 facsimile apparatus FX2 restores the line.

The T38 gateway apparatus GW1 sends a disconnection request packet to the T38 gateway apparatus GW2 to request disconnection of a communication path. Then, when receiving the disconcertion request packet, the T38 gateway apparatus GW2 sends a disconnection acknowledgment packet to the T38 gateway apparatus GW1. Then, the series of the communication operations end.

As a result, a line between the group 3 facsimile apparatus FX1 and the T38 gateway apparatus GW1, and a line between the group 3 facsimile apparatus FX2 and the T38 gateway apparatus GW2 are restored, and a real-time communication path between the group 3 facsimile apparatus FX1 and the group 3 facsimile apparatus FX2 is disconnected.

As mentioned above, the facsimile transmission procedure between the group 3 facsimile apparatus FX1 and the group 3 facsimile apparatus FX2 is performed in real time by the real-time transmission procedure of the T38 gateway apparatus GW1 and the T38 gateway apparatus GW2, so that image information can be sent from the group 3 facsimile apparatus FX1 to the group 3 facsimile apparatus FX2.

The signal (T30IND:"signal name") shown in FIG. 3 is a signal for notifying of detection of a tonal signal conforming to the ITU-T recommendation T.30, and the signal (V21HDLC:"signal name") is a signal for carrying a binary signal conforming to the ITU-T recommendation T.30. In addition, "v.21" indicates a signal carried by the ITU-T recommendation v.21 modem, and "HDLC" indicates a signal having the HDLC frame.

By performing exchange of the signals as mentioned above, the real-time transmission procedure can be realized between the T38 gateway apparatus GW1 and the T38 gateway apparatus GW2.

The SETUP packet sent by the T38 gateway apparatus GW1 to the T38 gateway apparatus GW2 to request connection and the CONNECT packet sent by the T38 gateway apparatus GW2 to the T38 gateway apparatus GW1 to acknowledge connection are signals defined in the TTC standard JT-H225.0. Each of the packets includes a manufacturer code indicating a manufacturing maker and a product code indicating a product name (product number).

In the above-mentioned transmission procedure, since an optional signal for negotiating the non-standard mode includes maker specific information, if a maker of the T38 gateway apparatuses GW1, GW2 and a maker of the group 3 facsimile apparatuses FX1, FX2 are different, the T38 gateway apparatuses GW1, GW2 cannot appropriately interpret the information in the optional signal exchanged between the group 3 facsimile apparatuses FX1 and FX2 as mentioned before.

The optional signal includes a maker code indicating a maker of a terminal that transmits the optional signal. The maker code can be read by all terminals. Thus, the T38 gateway apparatuses GW1 and GW2 can interpret the maker code in the optional signal.

Therefore, in this embodiment, when the T38 gateway apparatus (GW1 or GW2) receives the optional signal, the T38 gateway apparatus interprets the maker code of the optional signal. If the maker code is the same as one registered in the T38 gateway apparatus as a maker code that can be interpreted, the T38 gateway apparatus passes the optional signal through. If the maker code is not the same as one registered in the T38 gateway apparatus, the T38 gateway apparatus discards the received optional signal.

By adopting this configuration, even when the maker of the group 3 facsimile apparatuses FX1, FX2 and the maker of the T38 gateway apparatuses GW1, GW2 are different, the optional signal that the T38 gateway apparatuses GW1, GW2 cannot understand can be discarded. Thus, standard communication functions are adopted so that proper image information communication can be performed.

More particularly, for example, when the maker of the group 3 facsimile apparatuses FX1, FX2 and the maker of the T38 gateway apparatuses GW1, GW2 are different, and when makers of the group 3 facsimile apparatuses FX1 and FX2 are the same, the optional signal NSF sent from the group 3 facsimile apparatus FX2 of the incoming call side to the group 3 facsimile apparatus FX1 of the call originating side passes through the T38 gateway apparatuses GW1 and GW2, and arrives at the group 3 facsimile apparatus FX1. Then, the group 3 facsimile apparatus FX1 regards the optional signal NSF effective so as to set a communication function of a non-standard mode and notifies the receiving side of the non-standard communication function by using the optional signal NSS.

Then, the optional signal NSS also passes through the T38 gateway apparatuses GW1 and GW2, and arrives at the group 3 facsimile apparatus FX2 in the incoming call side. The optional signal NSS is properly processed in the group 3 facsimile apparatus FX2. Thus, after that, the group 3 facsimile apparatuses FX1 and FX2 try to perform the non-standard mode communication operation.

However, since the T38 gateway apparatus GW2 cannot interpret the value of the information field of the optional signal NSS, the T38 gateway apparatus GW2 cannot determine the transmission speed at which the T38 gateway apparatus GW2 transmits the image information signal received from the T38 gateway apparatus GW1 to the group 3 facsimile apparatus FX2. Therefore, communication fails at a stage (phase C) of sending and receiving of image information.

To prevent this problem, as mentioned above, when the T38 gateway apparatus GW2 receives the optional signal NSF from the group 3 facsimile apparatus FX2 and detects that the maker code in the optional signal NSF is different from that registered in the T38 gateway apparatus GW2, the T38 gateway apparatus GW2 discards the received optional signal NSF such that the optional signal is not sent to the T38 gateway apparatus GW1. Then, after that, the exchange of the optional signal is not performed in the group 3 facsimile transmission procedure between the group 3 facsimile apparatus FX1 and the group 3 facsimile apparatus FX2. That is, after that, since the exchange of the optional signal is not performed, the T38 gateway apparatuses GW1 and GW2 can interpret all T30 facsimile signals. As a result, image information communication can be properly performed between the group 3 facsimile apparatus FX1 and the group 3 facsimile apparatus FX2.

According to the present embodiment, one or more maker codes by which the optional signal can be passed through are registered beforehand in the T38 gateway apparatuses GW1 and GW2. Every maker code of which the optional signal can be interpreted may be registered.

Figure 4:
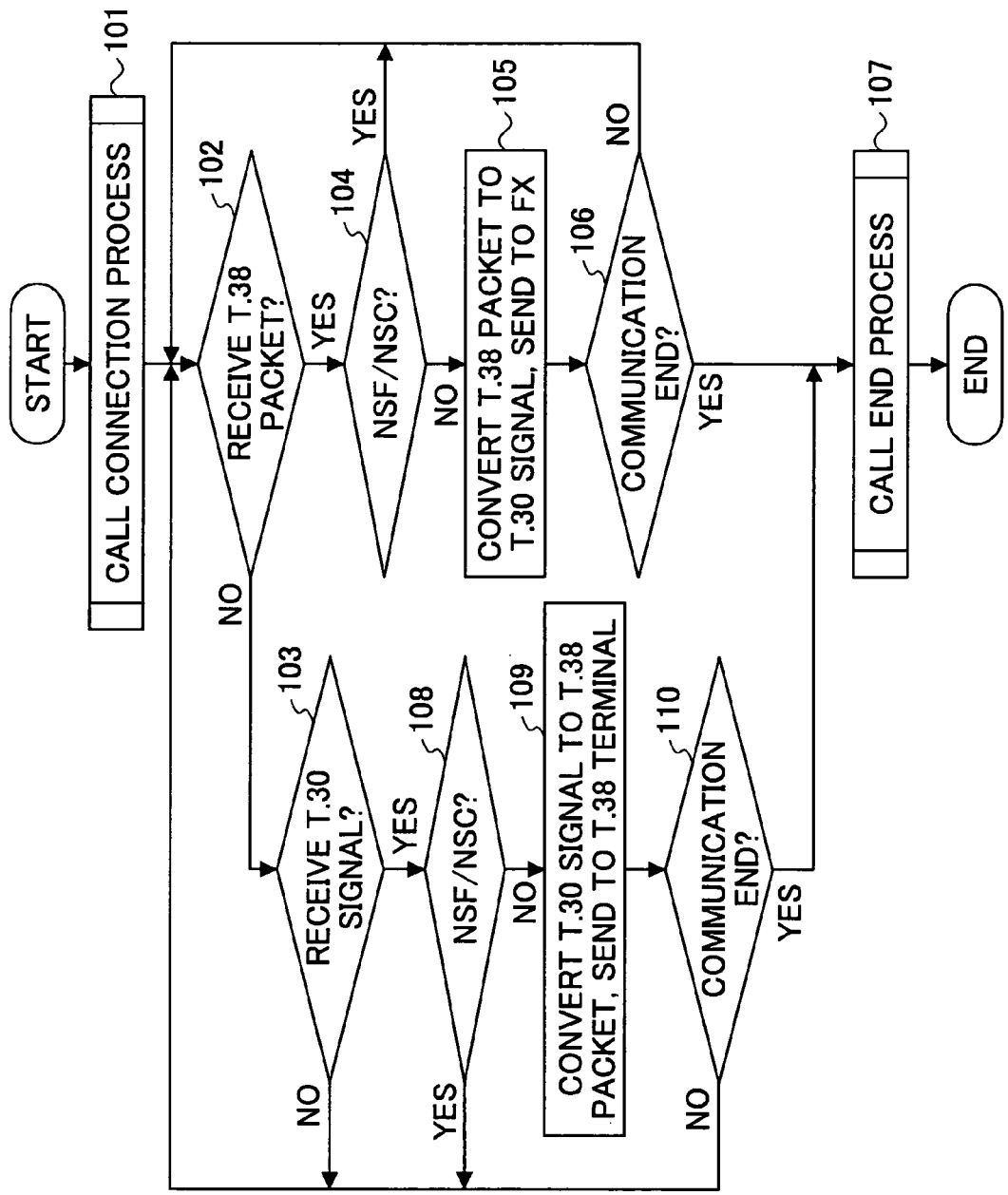
FIG. 4 is a flowchart showing an example of the communication process in the T38 gateway apparatus.

FIG. 4 shows an example of communication processes performed by the T38 gateway apparatus (GW1 or GW2). First, the T38 gateway apparatus performs a predetermined call connection processes between the T38 gateway apparatus and a T38 gateway apparatus at the other end in step 101. As a result, a communication path is established among the group 3 facsimile apparatus of the call originating side, the T38 gateway apparatus of the call originating side, the T38 gateway apparatus of the call incoming side, and the group 3 facsimile apparatus of the call incoming side.

In this state, the T38 gateway apparatus monitors a T38 packet from the IP network or a T30 facsimile signal from the analog public network (judgment steps 102, 103, No loop).

When the T38 gateway apparatus receives the T38 packet from the IP network (Yes in step 102), the T38 gateway apparatus checks whether the T38 packet indicates the optional signal NSF or NSC in step 104, if the T38 packet indicates the optional signal NSF or NSC (Yes in step 104), the T38 gateway apparatus discards the received T38 packet, and the process goes to step 102 and the T38 gateway apparatus receives a next packet.

If the received T38 packet does not indicate the optional signal NSF or NSC (No in step 104), the T38 gateway apparatus converts the received T38 packet to a T30 facsimile signal, and sends the signal to a group 3 facsimile apparatus in a call originating side or in a call incoming side in step 105.

The T38 gateway apparatus checks whether the communication ends in step 106. If the communication has not yet ended (No in step 106), the process returns to the step 102. If the communication ended (Yes in step 106), the T38 gateway apparatus performs a predetermined call end process in step 107, and disconnects the established communication path so as to complete the communication operation.

If the T38 gateway apparatus receives the T30 facsimile signal from the analog public network (Yes in step 103), the T38 gateway apparatus checks whether the received T30 facsimile signal indicates the optional signal NSF or NSC in step 108. If the T30 facsimile signal is the optional signal NSF or NSC (Yes in step 108), the T38 gateway apparatus discard the received T30 facsimile signal, and the process goes to step 102 and the T38 gateway apparatus receives a next packet.

If the received T30 facsimile signal is not the optional signal NSF or NSC (No in step 108), the T38 gateway apparatus converts the received T30 facsimile signal to a corresponding T38 packet, and sends the packet to a T38 gateway apparatus (or after mentioned T38 terminal apparatus) in a call originating side or in a call incoming side in step 109.

The T38 gateway apparatus checks whether the communication ends in step 110. If the communication has not yet ended (No in step 110), the process returns to the step 102. If the communication ended (Yes in step 10), the T38 gateway apparatus performs a predetermined call end process in step 107, and disconnects the established communication path so as to complete the communication operation.

In the procedure shown in FIG. 4, since the optional signal is not allowed to pass through the T38 gateway apparatus regardless of the maker code, the effect same as the before mentioned effect can be obtained.

Figure 5:
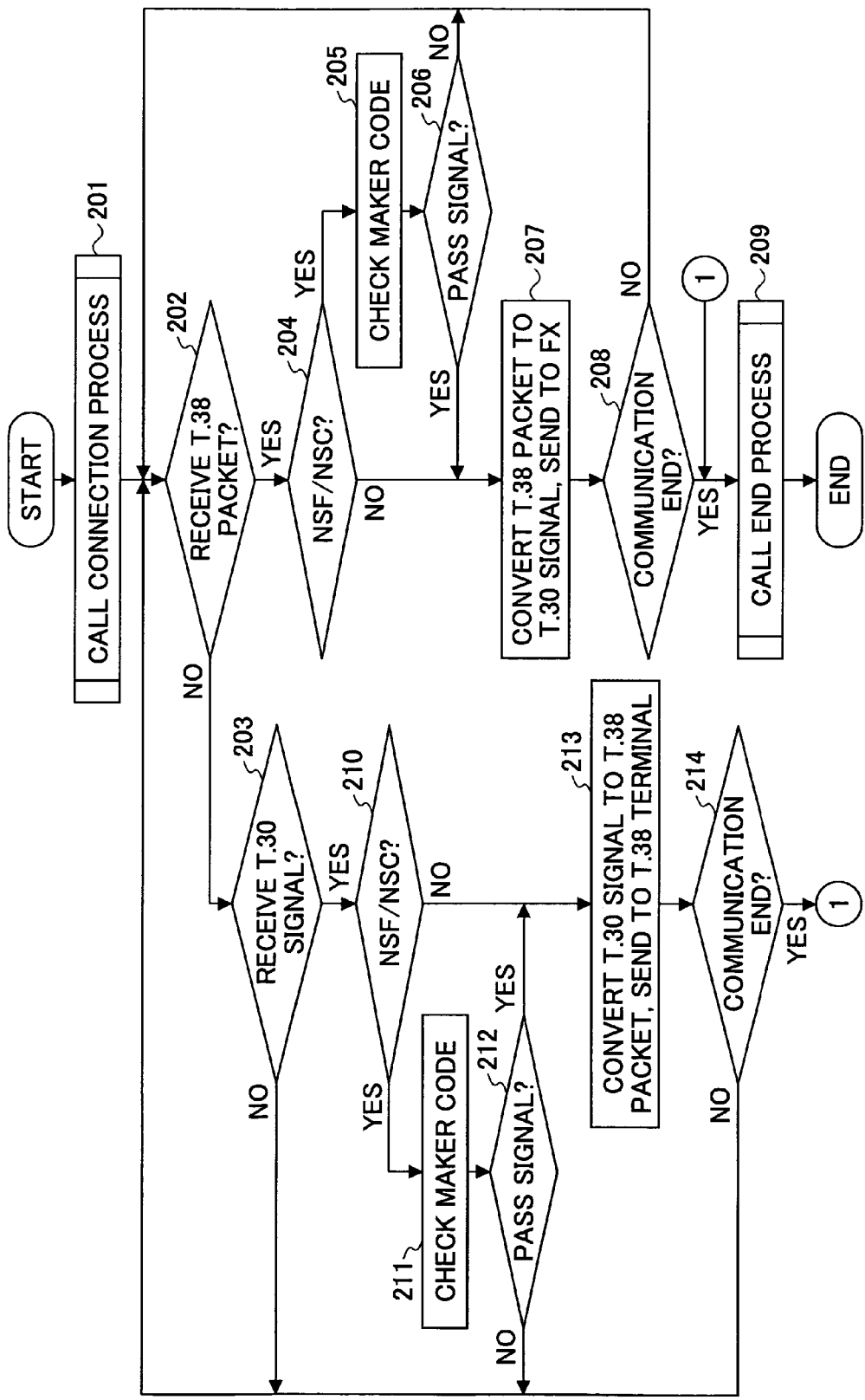
FIG. 5 is a flowchart showing another example of the communication process in the T38 gateway apparatus.

FIG. 5 shows another example of communication processes performed by the T38 gateway apparatus (GW1 or GW2). First, the T38 gateway apparatus performs a predetermined call connection processes between the T38 gateway apparatus and a T38 gateway apparatus at the other end in step 201. As a result, a communication path is established among the group 3 facsimile apparatus of the call originating side, the T38 gateway apparatus of the call originating side, the T38 gateway apparatus of the call incoming side, and the group 3 facsimile apparatus of the call incoming side.

In this state, the T38 gateway apparatus monitors a T38 packet from the IP network or a T30 facsimile signal from the analog public network (judgment steps 202, 203, No loop).

When the T38 gateway apparatus receives the T38 packet from the IP network (Yes in step 202), the T38 gateway apparatus checks whether the T38 packet indicates the optional signal NSF or NSC in step 204. If the T38 packet indicates the optional signal NSF or NSC (Yes in step 204), the T38 gateway apparatus checks whether the maker code in the optional signal NSF/NSC is the same as one registered in the T38 gateway apparatus in step 205 to determine whether the signal can be passed through the T38 gateway apparatus in step 206. If the maker code in the optional signal NSF/NSC is not the same as one registered in the T38 gateway apparatus (No in step 206), the T38 gateway apparatus discards the received T38 packet, and the process goes to step 202 and the T38 gateway apparatus receives a next packet.

If the received T38 packet is not the optional signal NSF or NSC (No in step 204) or if the maker code in the optional signal NSF/NSC is the same as one registered in the T38 gateway apparatus (Yes in step 206), the T38 gateway apparatus converts the received T38 packet to a corresponding T30 facsimile signal, and sends the signal to a group 3 facsimile apparatus in a call originating side or in a call incoming side at the time in step 207.

The T38 gateway apparatus checks whether the communication ends in step 208. If the communication has not yet ended (No in step 208), the process returns to the step 202. If the communication ended (Yes in step 208), the T38 gateway apparatus performs a predetermined call end process in step 209, and disconnects the established communication path so as to end the communication operation.

When the T38 gateway apparatus receives the T30 facsimile signal from the IP network (Yes in step 203), the T38 gateway apparatus checks whether the T30 facsimile signal indicates the optional signal NSF or NSC in step 210, if the T30 facsimile signal indicates the optional signal NSF or NSC (Yes in step 210), the T38 gateway apparatus checks whether the maker code in the optional signal NSF/NSC is the same as one registered in the T38 gateway apparatus in step 211 to determine whether the signal can be passed through the T38 gateway apparatus in step 212. If the maker code in the optional signal NSF/NSC is not the same as one registered in the T38 gateway apparatus (No in step 212), the T38 gateway apparatus discards the received T30 facsimile signal, and the process goes to step 202 and the T38 gateway apparatus receives a next packet.

If the received T30 facsimile signal is not the optional signal NSF or NSC (No in step 210), or if the maker code in the optional signal NSF/NSC is the same as one registered in the T38 gateway apparatus (Yes in step 212), the T38 gateway apparatus converts the received T30 facsimile signal to a corresponding T38 packet, and sends the packet to a T38 gateway apparatus (or to the T38 terminal apparatus) in a call originating side or in a call incoming side at the time in step 213.

The T38 gateway apparatus checks whether the communication ends in step 214. If the communication has not yet ended (No in step 214), the process returns to the step 202. If the communication ended (Yes in step 214), the T38 gateway apparatus performs a predetermined call end process in step 209, and disconnects the established communication path so as to end the communication operation.

The T38 terminal apparatus is a terminal apparatus including facsimile apparatus functions and communication functions conforming to the recommendation T.38, and the T38 terminal apparatus also includes the T38 gateway apparatus.

Figure 6:
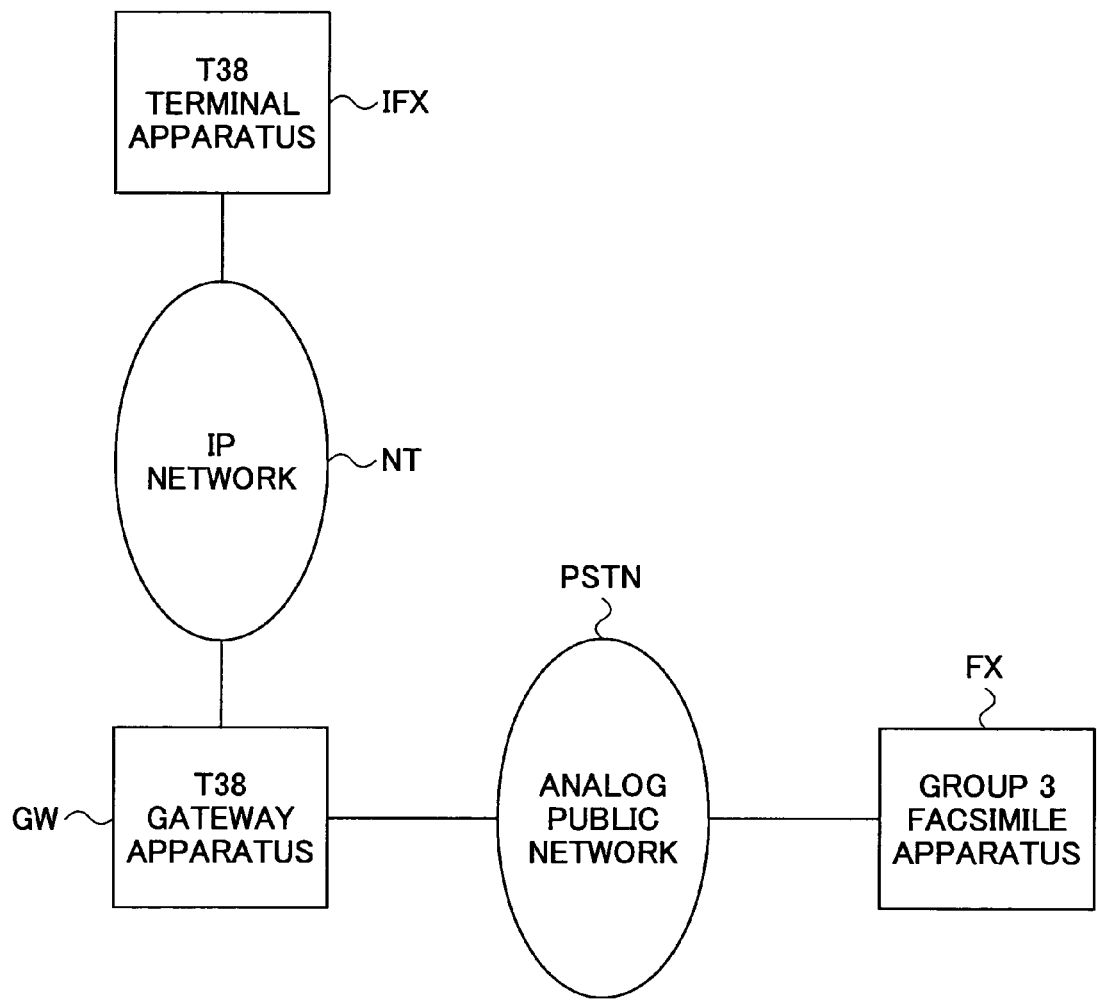
FIG. 6 is a block diagram showing another example of a communication system of an embodiment of the present invention.

FIG. 6 shows another example of a communication system of an embodiment of the present invention.

The facsimile communication system includes a T38 terminal apparatus IFX that is connected to an IP network NT and that conforms to the ITU-T recommendation T.38, a group 3 facsimile apparatus FX connected to an analog public network PSTN, and a T38 gateway apparatus GW that is connected to the analog public network PSTN and to the IP network NT and that conforms to the ITU-T recommendation T.38.

The group 3 facsimile apparatus FX and the T38 gateway apparatus GW are placed in a same area. The T38 terminal apparatus IFX are placed remotely from the group 3 facsimile apparatus FX and the T38 gateway apparatus GW. In this configuration, the T38 gateway apparatus GW provides a real-time internet facsimile communication service conforming to the recommendation T.38 for the group 3 facsimile apparatus FX.

Figure 7:
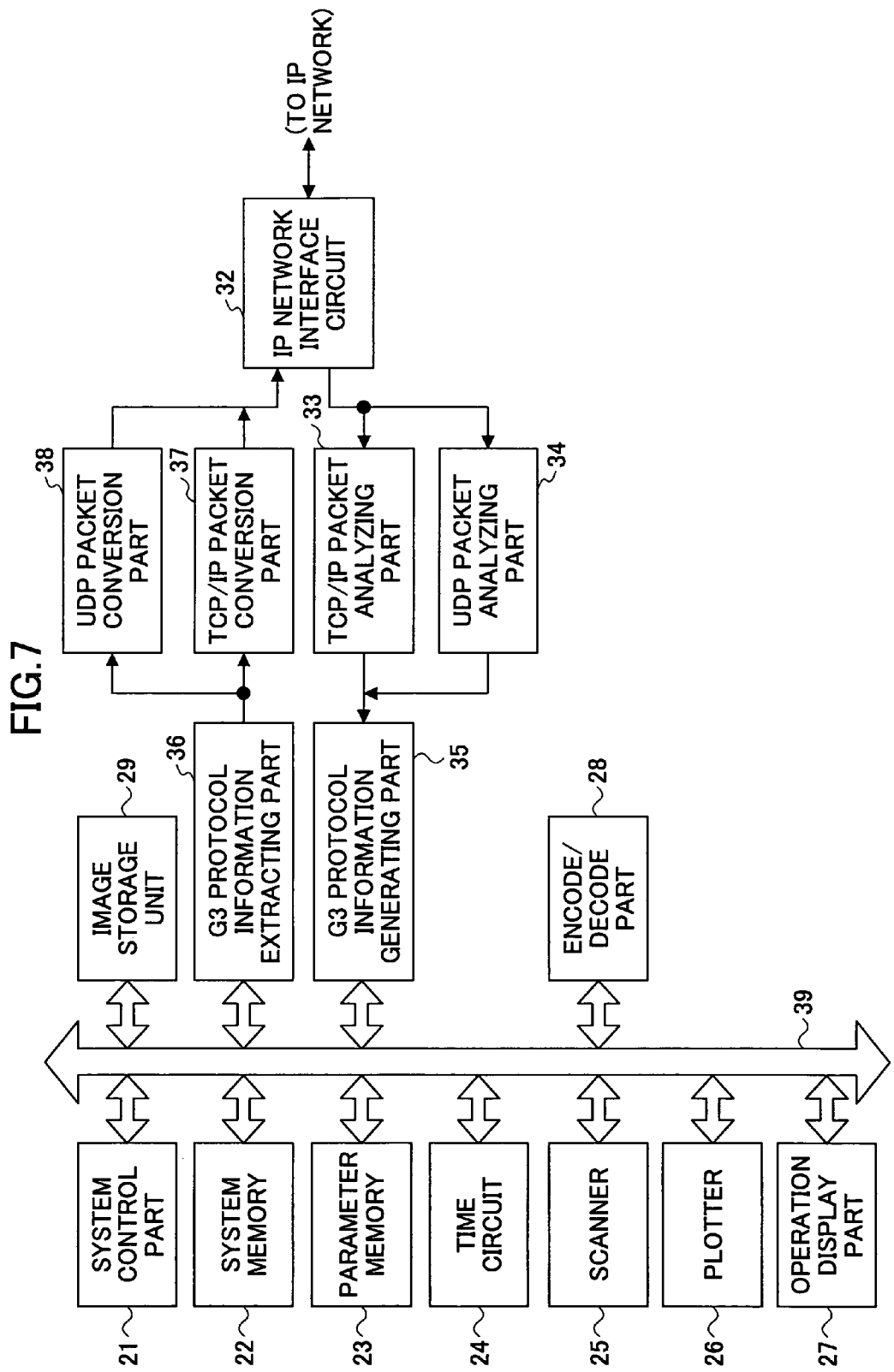
FIG. 7 is a block diagram showing a configuration example of the T38 terminal apparatus IFX.

FIG. 7 shows a configuration example of the T38 terminal apparatus IFX.

In the figure, a system control part 21 performs various control processes such as control processes for each part of the T38 terminal apparatus IFX, and real-time transmission control procedure (ITU-T recommendation T.38 procedure) processes. A system memory 22 stores a control processing program to be executed by the system control part 21 and various data necessary for executing processing programs. The system memory 22 also forms a work area for the system control part 21. A parameter memory 23 stores various pieces of information specific to the T38 terminal apparatus IFX. A time circuit 24 outputs current time information.

A scanner 25 reads a document image with a predetermined resolution. A plotter 26 outputs an image with a predetermined resolution. An operation display part 27 is used for operating the T38 terminal apparatus IFX, and includes various operation keys and various indicators.

The encode/decode part 28 encode-compresses image signals and decodes compressed image information into original image signals. An image storage unit 29 is for storing compressed image information.

An IP network interface circuit 32 is used for connecting the T38 terminal apparatus IFX to the IP network NT so as to send and receive data via the IP network NT. A TCP/IP packet analyzing part 33 is used for, in a TCP mode, analyzing a TCP/IP packet received by the IP network interface circuit 32 to extract received information. A UDP packet analyzing part 34 is used for, in a UDP mode, analyzing a UDP packet received by the IP network interface circuit 32 to extract received information.

In a real time transmission procedure, a group 3 protocol information generation part 35 converts, in the TCP mode, received information output from the TCP/IP packet analyzing part 33 into corresponding group 3 transmission procedure signal information. In addition, in the UDP mode, the group 3 protocol information generation part 35 converts received information output from the UDP packet analyzing part 34 into corresponding group 3 transmission procedure signal information.

In a real time transmission procedure, a group 3 protocol information extracting part 36 is used for extracting group 3 facsimile transmission procedure information to be transmitted. A TCP/IP packet conversion part 37 is used for, in the TCP mode, converting the group 3 facsimile transmission procedure information output from the group 3 protocol information extracting part 36 into TCP/IP packet data. The output data is applied to the IP network interface circuit 32.

The UDP packet conversion part 38 is used for, in the UDP mode, converting the group 3 facsimile transmission procedure information output from the group 3 protocol information extracting part 36 into UDP packet data. The output data is applied to the IP network interface circuit 32.

The system control part 21, the system memory 22, the parameter memory 23, the time circuit 24, the scanner, the plotter 26, the operation display part 27, the encode/decode part 28, the image storage unit 29, the group 3 protocol information generating part 35, and the group 3 protocol information extracting part 36 are connected to an internal bus 39, such that data exchange between these components are mainly performed via the internal bus 39.

Figure 8:
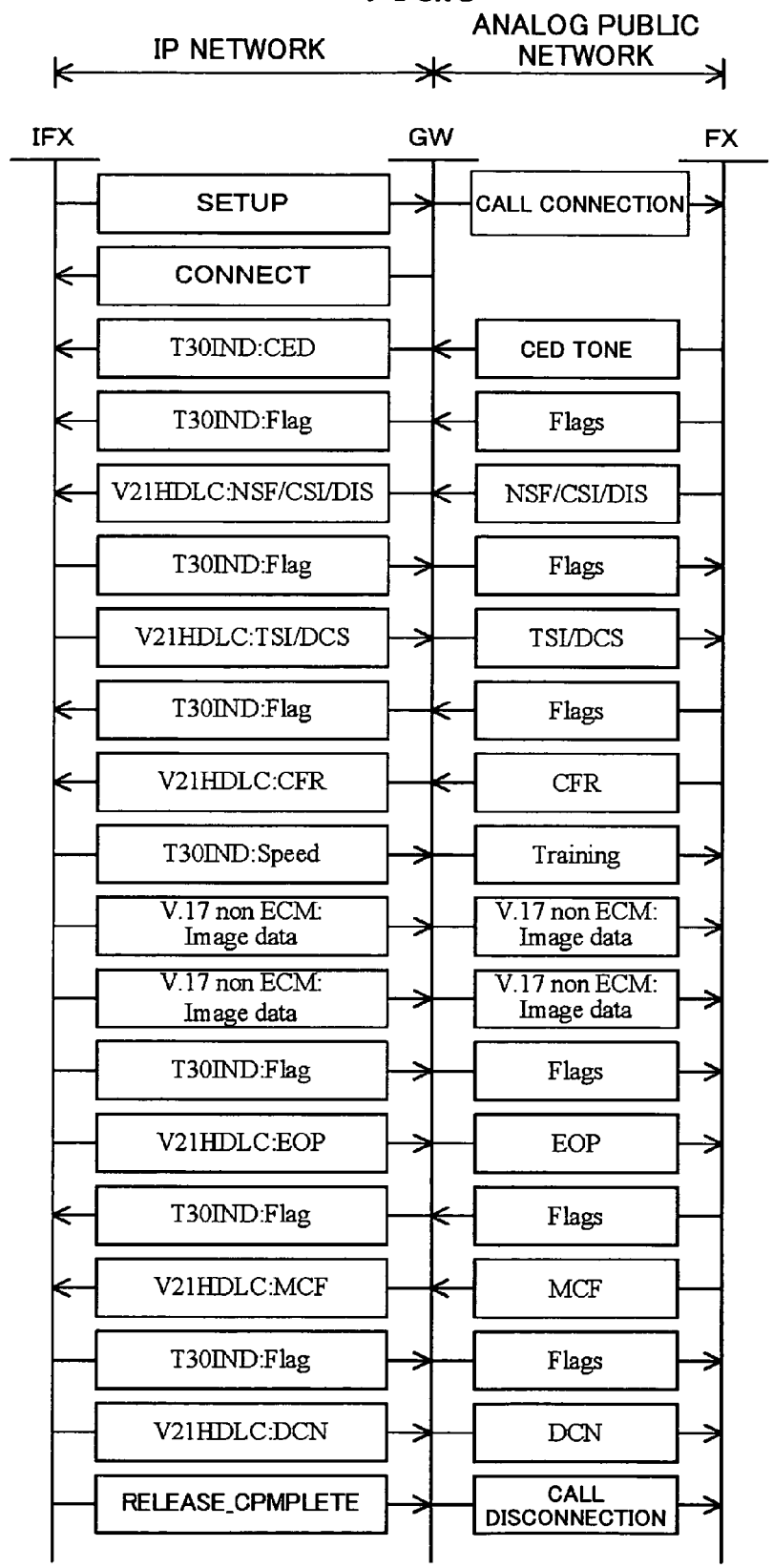
FIG. 8 is a time chart showing an example of a procedure in a case where the T38 terminal apparatus IFX originates a call to the group 3 facsimile apparatus FX to send image information.
Figure 9:
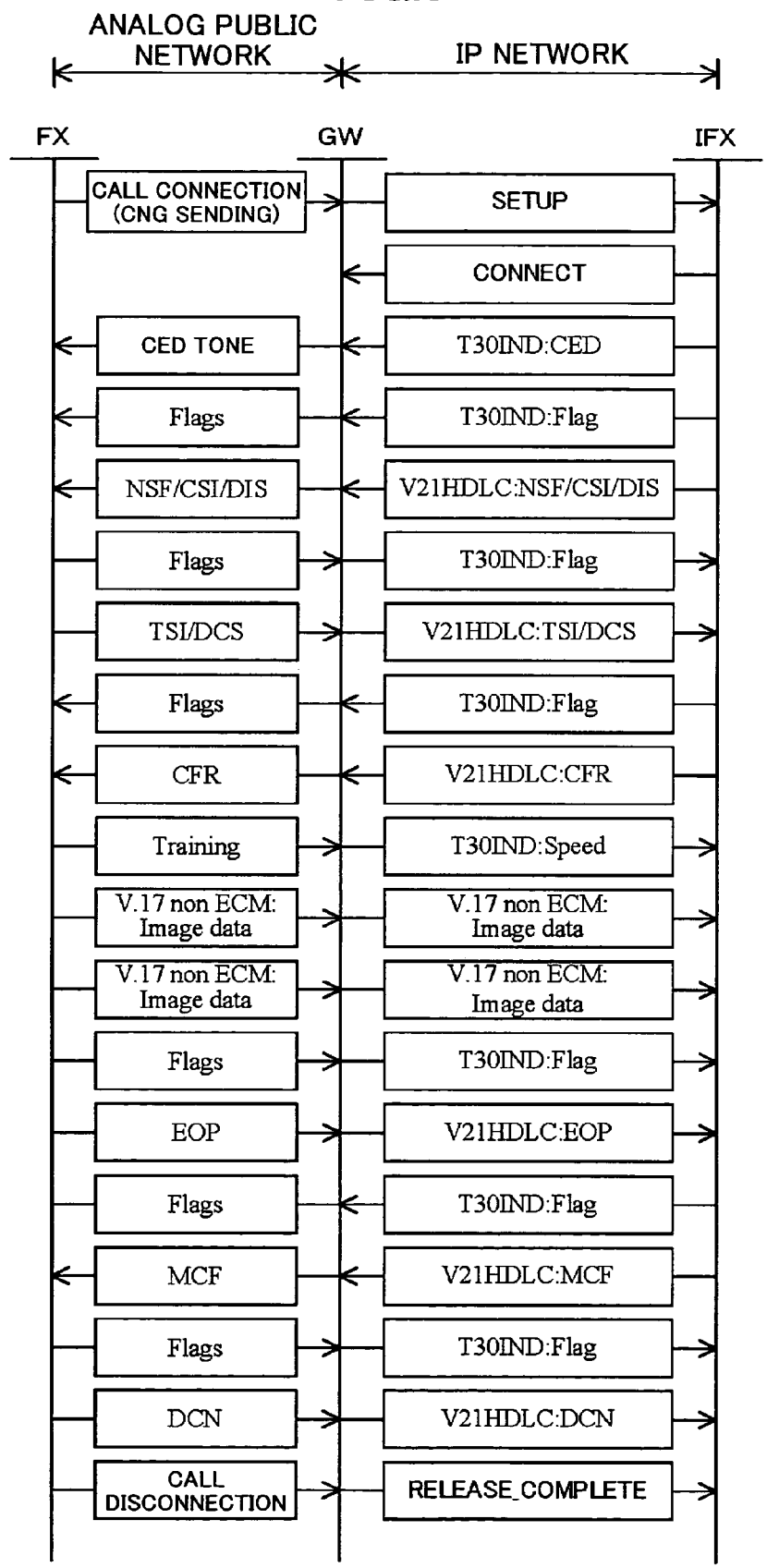
FIG. 9 is a time chart showing an example of a procedure in a case where the group 3 facsimile apparatus FX originates a call to the T38 terminal apparatus IFX to send image information.

FIG. 8 shows an example of a procedure in a case where the T38 terminal apparatus IFX originates a call to the group 3 facsimile apparatus FX to send image information. FIG. 9 shows an example of a procedure in a case where the group 3 facsimile apparatus FX originates a call to the T38 terminal apparatus IFX to send image information. Details of these procedures are almost the same as those of FIG. 3.

In this embodiment, the T38 terminal apparatus IFX refers to a manufacturer code and a product code included in the SETUP packet and the CONNECT packet exchanged between the T38 terminal apparatus IFX and the T38 gateway apparatus GW when call connection process is performed, so that the T38 terminal apparatus IFX checks whether T38 terminal apparatus IFX can communicate an optional signal of the group 3 facsimile transmission procedure with a terminal at the other end.

Thus, the T38 terminal apparatus IFX registers beforehand one or more of manufacturer codes and product codes of the T38 gateway apparatus GW through which the optional signal can be passed.

The T38 terminal apparatus IFX checks whether the manufacturer code and the product code in the SETUP packet or the CONNECT packet are the same as those registered in the T38 terminal apparatus IFX. If they are the same, the T38 terminal apparatus IFX sets a mode for transmitting the optional signal. If they are not the same, the T38 terminal apparatus IFX sets a mode for not-transmitting the optional signal.

After that, when the procedure before transmission is performed, if the mode for transmitting the optional signal is set, the procedure before transmission including exchange of the optional signal is performed. If the mode for not-transmitting the optional signal is set, the procedure before transmission that does not include exchange of the optional signal is performed.

As a result, the non-standard communication operation using the optional signal can be properly performed.

Figure 10:
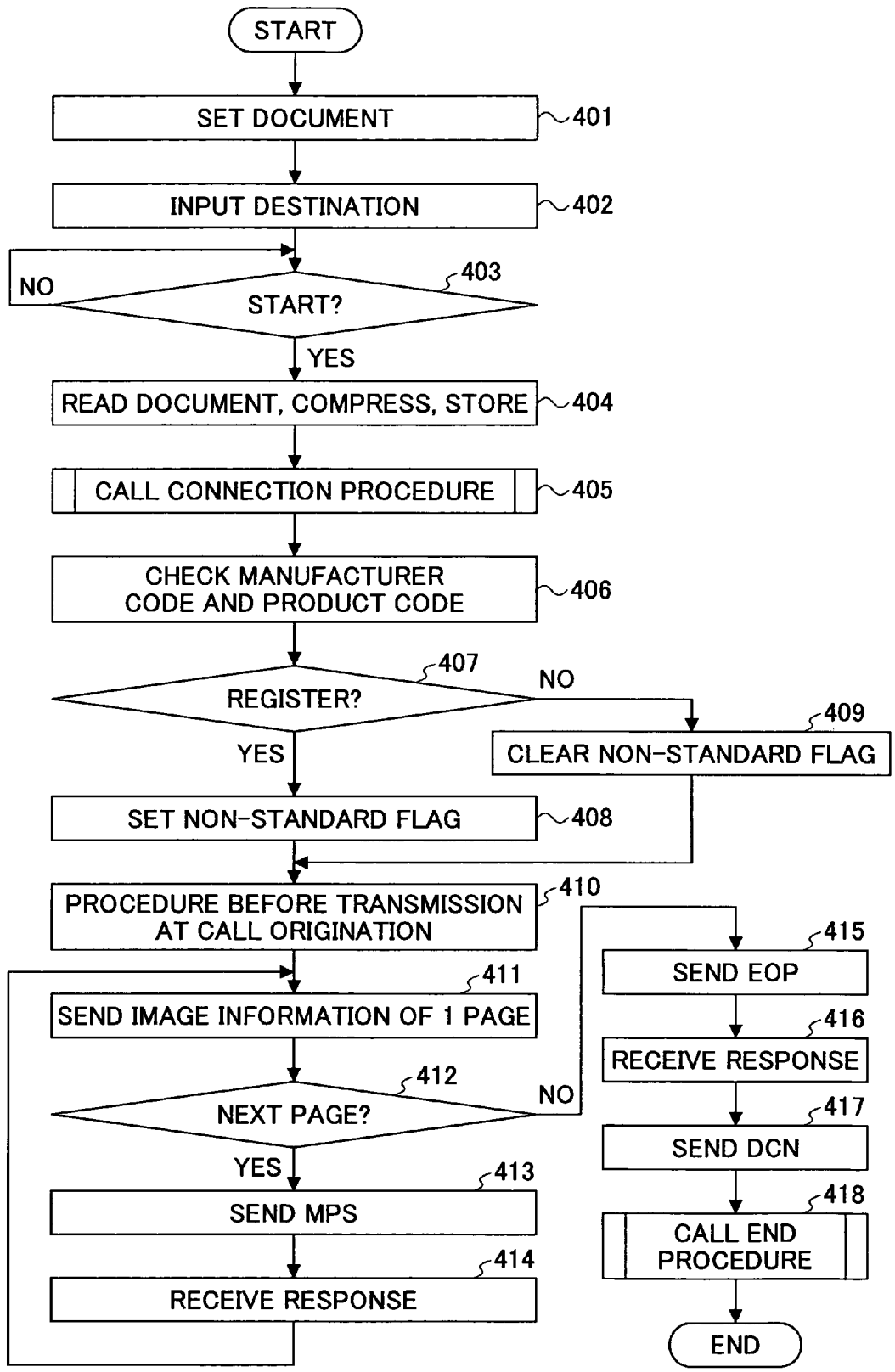
FIG. 10 is a flowchart showing an example of a procedure of the T38 terminal apparatus IFX when the T38 terminal apparatus IFX originates a call.

FIG. 10 shows an example of a procedure when the T38 terminal apparatus IFX originates a call.

A user sets a sending document on a scanner in step 401, inputs a facsimile number of the other party in step 402, and pushes a start key of the operation display part 27 to instruct to start sending in step 403. Then, the T38 terminal apparatus reads the image of the sending document set on the scanner 25. The encode/decode part 28 encode-compresses the image data, and the obtained image information is stored in the image storage apparatus 29 in step 404.

Next, the T38 terminal apparatus IFX performs a predetermined call connection procedure between the T38 terminal apparatus IFX and the T38 gateway apparatus GW at the other end, so as to establish a communication path to the group 3 facsimile apparatus FX in step 405.

The T38 terminal apparatus IFX checks whether the manufacturer code and the product code in the CONNECT packet received from the 38 gateway apparatus GW are the same as those registered in the T38 terminal apparatus IFX in step 406. If they are registered (Yes in step 407), the T38 terminal apparatus IFX sets non-standard flag, and sets the mode for transmitting the optional signal in step 408. If they are not registered (No in step 407), the T38 terminal apparatus IFX clears non-standard flag, and sets the mode for not-transmitting the optional signal in step 409.

Next, a procedure before transmission at the time of call origination is performed in step 410. In step 410, the T38 terminal apparatus IFX refers to the value of the non-standard flag. If the non-standard flag is set, the T38 terminal apparatus IFX performs operations such as setting communication functions by using the optional signal. If the non-standard flag is not set, the T38 terminal apparatus IFX performs operations such as setting communication functions without using the optional signal.

Next, the T38 terminal apparatus IFX sends the image information stored in the image storage apparatus 29 by one page to the terminal at the other end in step 411. After the T38 terminal apparatus IFX completes to sent the page, the T38 terminal apparatus IFX checks whether there is a next page to send in step 412.

If there is a next page (Yes in step 412), the T38 terminal apparatus IFX sends a signal MSP as an after-message signal in step 413, receives a response signal in step 414. Then, the process returns to the step 411, so that the T38 terminal apparatus IFX sends remaining pages.

If there is not a next page (No in step 412), the T38 terminal apparatus IFX sends a signal EOP as an after-message signal in step 415, receives a response signal in step 416, sends a signal DCN in step 417, and performs a predetermined call end process in step 418. Then, the established path is disconnected and the communication operation at this time ends.

Figure 11:
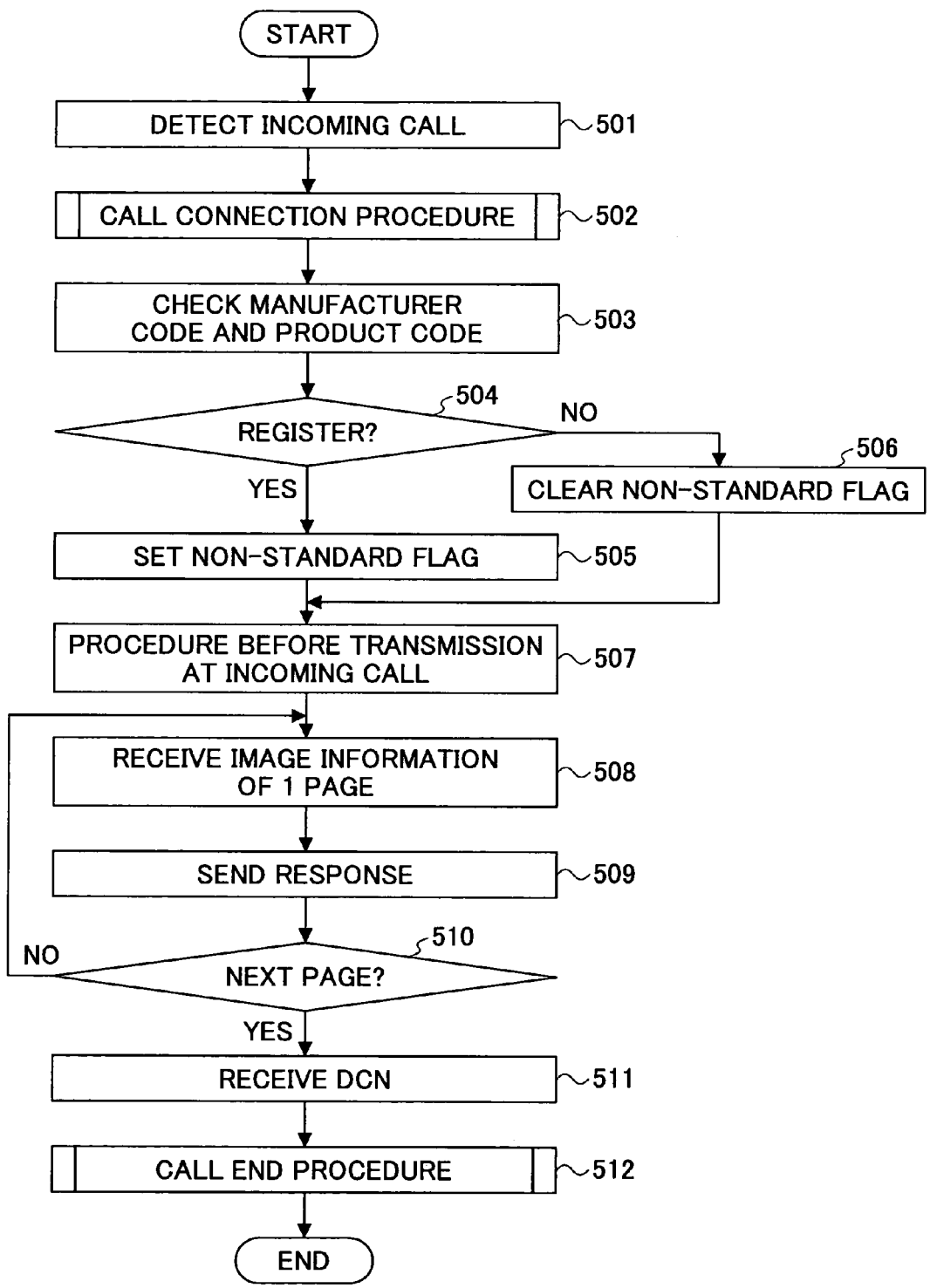
FIG. 11 is a flowchart showing an example of a procedure of the T38 terminal apparatus IFX when the T38 terminal apparatus IFX receives an incoming call.

FIG. 11 shows an example of a procedure at the time of receiving an incoming call in the T38 terminal apparatus IFX.

When the T38 terminal apparatus IFX detects an incoming call in step 501, the T38 terminal apparatus IFX performs a predetermined call connection procedure between the T38 terminal apparatus IFX and the T38 gateway apparatus GW at the other end, so as to establish a communication path to the destination group 3 facsimile apparatus FX in step 502.

The T38 terminal apparatus IFX checks whether the manufacturer code and the product code in the SETUP packet received from the 38 gateway apparatus GW are the same as those registered in the T38 terminal apparatus IFX in step 503. If they are registered (Yes in step 504), the T38 terminal apparatus IFX sets non-standard flag, and sets the mode for transmitting the optional signal in step 505. If they are not registered (No in step 504), the T38 terminal apparatus IFX clears non-standard flag, and sets the mode for not-transmitting the optional signal in step 506.

Next, a procedure before transmission at the time of call incoming is performed in step 507. In step 507, the T38 terminal apparatus IFX refers to the value of the non-standard flag. If the non-standard flag is set, the T38 terminal apparatus IFX performs operations such as setting communication functions by using the optional signal. If the non-standard flag is not set, the T38 terminal apparatus IFX performs operations such as setting communication functions without using the optional signal.

Next, the T38 terminal apparatus IFX receives the image information by one page from the terminal at the other end, and stored the received image information in the image storage apparatus 29 in step 508. When receiving of the page is completed, the T38 terminal apparatus IFX sends a receiving result as a response in step 509.

Then, the T38 terminal apparatus IFX checks whether there is a next sending page on the basis of information in a received after-message signal. If there is a next sending page (Yes in step 510), the process returns to the step 508 and the T38 terminal apparatus IFX receives image information of the next page.

If there is not a next sending page (No in step 510), the T38 terminal apparatus IFX receives a signal DCN from the terminal at the other end in step 511, and performs a predetermined call end process in step 512. Then, the established communication path is disconnected and the communication operation is completed.

The present invention is not limited to the specifically disclosed embodiments, and variations and modifications may be made without departing from the scope of the present invention.

The present application contains subject matter related to Japanese patent application No. 2003-328042, filed in the JPO on Sep. 19, 2003, the entire contents of which being incorporated herein by reference.

What is claimed is:

1. A network terminal apparatus including a terminal function conforming to the ITU-T recommendation T.38, wherein the network terminal apparatus can be connected to an IP network, the network terminal apparatus comprising:
    a code registration part configured to register a predetermined code by which a T.30 facsimile non-standard signal is passed through; and
    a communication control part configured to cause the network terminal apparatus:
        to perform communication operations by using the T.30 facsimile non-standard signal if a code included in a call control signal received in a call connection procedure is the predetermined code registered in the code registration part, and
        to perform communication operations by changing a T.30 facsimile non-standard signal if a code included in a call control signal received in a call connection procedure is not the predetermined code registered in the code registration part.

2. The network terminal apparatus of claim 1, further comprising:
    a protocol information generation part configured to convert packet data received by the network terminal apparatus through the IP network, into transmission procedure signal information.

3. The network terminal apparatus of claim 1, further comprising:
    a network interface part configured for connecting the network terminal apparatus to the IP network to send and receive packet data through the IP network; and
    a packet analyzing part configured to analyze a packet received through the network interface part and extract specific information from the received packet.

4. The network terminal apparatus of claim 1, further comprising:
    a protocol information extracting part configured to extract facsimile transmission procedure information to be transmitted; and
    a packet conversion part configured to convert the facsimile transmission procedure information to be transmitted, into packet data.

5. A communication method used in a network terminal apparatus including a terminal function conforming to the ITU-T recommendation T.38, wherein the network terminal apparatus can be connected to an IP network, said communication method comprising:
    (a) registering by the network terminal apparatus a predetermined code by which a T.30 facsimile non-standard signal is passed through;
    (b) performing communication operations by the network terminal apparatus, by using the T.30 facsimile non-standard signal if a code included in a call control signal received in a call connection procedure is the predetermined code registered in (a), and
    (c) performing communication operations by the network terminal apparatus, by changing a T.30 facsimile non-standard signal if the code included in the call control signal received in the call connection procedure is not the predetermined code registered in (a).

6. The communication method of claim 5, further comprising performing the call connection procedure to establish a communication path between the network terminal apparatus and another network apparatus prior to (b).

7. The communication method of claim 6, further comprising:
    (d) extracting the code included in the call control signal received in the call connection procedure, prior to (b); and
    (e) comparing the extracted code and the predetermined code registered in (a), and performing one of (b) and (c) based on a comparison result.

* * * * *